(12) United States Patent
Ooi et al.

(10) Patent No.: US 12,526,379 B2
(45) Date of Patent: Jan. 13, 2026

(54) AUTOMATIC IMAGE ORIENTATION VIA ZONE DETECTION

(71) Applicant: Dell Products L.P., Round Rock, TX (US)

(72) Inventors: Ghee Beng Ooi, Singapore (SG); Chih-Hao Kao, New Taipei (TW); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 504 days.

(21) Appl. No.: 17/951,249

(22) Filed: Sep. 23, 2022

(65) Prior Publication Data

US 2024/0106970 A1    Mar. 28, 2024

(51) Int. Cl.
*H04N 5/262* (2006.01)
*G06T 7/70* (2017.01)
(Continued)

(52) U.S. Cl.
CPC ............. *H04N 5/2628* (2013.01); *G06T 7/70* (2017.01); *G06V 40/16* (2022.01); *H04N 7/183* (2013.01);
(Continued)

(58) Field of Classification Search
CPC ........ G06V 10/44; G06V 10/25; G06V 10/24; G06V 10/242; G06V 10/255;
(Continued)

(56) References Cited

U.S. PATENT DOCUMENTS 7,574,016 B2 *  8/2009  Steinberg  ............... H04N 23/61
348/169
7,724,296 B2    5/2010  Lönn
(Continued)

FOREIGN PATENT DOCUMENTS

CN    101917548 A  * 12/2010
CN    107493506 A  * 12/2017

OTHER PUBLICATIONS

Ahdid, R., Taifi, K., Said, S. & Manaut, B., Euclidean & Geodesic Distance between a Facial Feature Points in Two-Dimensional Face Recognition System (Dec. 2016) in International Arab Conference on Information Technology (ACIT'2016) (Year: 2016).*
(Continued)

*Primary Examiner* — Andrew W Bee
*Assistant Examiner* — Emma E Dryden
(74) *Attorney, Agent, or Firm* — Zagorin Cave LLP; Robert W. Holland (57) ABSTRACT

An information handling system peripheral camera analyzes captured visual images to detect a face and analyzes the face to determine an upright orientation. Based upon the face upright orientation, the camera defines a visual image orientation to communicate the visual image from the peripheral camera to an information handling system so that the face is communicated in an upright orientation for use in a video conference, such as with an indication of a landscape or portrait image orientation. In one embodiment, an information handling system can perform the face upright orientation analysis and command a camera orientation to the camera so that visual images of the camera are communicated in alignment with the face upright orientation.

17 Claims, 6 Drawing Sheets

(51) Int. Cl.
*G06V 40/16* (2022.01)
*H04N 7/18* (2006.01)
*H04N 23/51* (2023.01)
*H04N 23/55* (2023.01)
*H04N 23/60* (2023.01)
*H04N 23/611* (2023.01)

(52) U.S. Cl.
CPC ............. *H04N 23/51* (2023.01); *H04N 23/55* (2023.01); *H04N 23/611* (2023.01); *H04N 23/64* (2023.01); *G06T 2207/30201* (2013.01)

(58) Field of Classification Search
CPC ............. G06V 40/16–193; G06T 2207/30201; G06T 2207/30196; G06T 7/73; G06T 5/80; G06T 7/60–70; G06T 3/60; G06T 7/579; G06T 2207/10004; G06T 2207/10016; G06T 2207/30244; G06T 7/246; G06T 7/80; G06F 2200/1614; H04N 7/15; H04N 7/155; H04N 7/157; H04N 7/14; H04N 21/44008; H04N 21/44; H04N 7/141; H04N 7/147; H04N 7/142; H04N 21/4788; H04N 23/00; H04N 23/55; H04N 5/222; H04N 5/262; H04N 7/183–185; H04N 23/51; H04N 23/60–61; H04N 5/2628; H04N 1/3877; H04N 23/611; H04N 1/387; H04N 1/3872; H04N 23/64
See application file for complete search history.

(56) References Cited

U.S. PATENT DOCUMENTS

| | | |
|---|---|---|
| 8,581,960 B2 | 11/2013 | Klyoshige |
| 8,705,808 B2 | 4/2014 | Determan et al. |
| 9,692,964 B2 | 6/2017 | Steinberg et al. |
| 10,203,692 B2 | 2/2019 | Smith et al. |
| 10,375,357 B2 | 8/2019 | Wang et al. |
| 10,580,149 B1 * | 3/2020 | Lakshminarayanan ...................... H04N 7/147 |
| 2023/0319219 A1 * | 10/2023 | Vacura ................. H04N 5/2628 348/14.08 |

OTHER PUBLICATIONS

Sabri, B., Henry, J., Ibrahim, Z., et al., A Comparison of Face Detection Classifier using Facial Geometry Distance Measure</i> (Aug. 2018) in 9th IEEE Control and System Graduate Research Colloquium (ICSGRC), pp. 116-120, DOI:10.1109/ICSGRC.2018. 8657592. (Year: 2018).*

* cited by examiner

AUTOMATIC IMAGE ORIENTATION VIA ZONE DETECTION

BACKGROUND OF THE INVENTION

Field of the Invention

The present invention relates in general to the field of information handling system visual image capture, and more particularly to an information handling system camera having automatic image orientation via zone detection.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components that cooperate to execute instructions to process information. Desktop information handling systems typically operate in a fixed location and interact with an end user through peripheral input/output (I/O) devices, such as a peripheral display, keyboard, mouse and camera. Portable information handling systems integrate I/O devices in a portable housing and also typically can interface with peripheral I/O devices. Both desktop and portable information handling systems provide a powerful communication tool to support videoconference communication. In addition to communication of audiovisual content captured by a camera, information handling systems can support interactions between multiple users and sharing of documents and presentations.

When using a portable information handling system, the end user typically views a videoconference at an integrated display having a known alignment relative to an integrated camera. For example, a tablet information handling system, such as a smartphone, typically has a landscape and portrait orientation determined by an accelerometer or similar sensor integrated in the portable housing. When an end user rotates the housing between the landscape and portrait orientations, the displayed visual images rotate to remain aligned with the end user viewing position. Similarly, when a camera in the portable housing captures visual images to communicate through a videoconference, the visual images are sent with an upright orientation based upon the sensed orientation of the portable housing. This can lead to some confusion for a portable information handling system end user. For example, when an image taken in a portrait orientation is mistakenly sent as having a landscape orientation, the portable information handling system presents the image sideways; yet, the end user who attempts to rotate the portable housing to view the image upright will have the image automatically rotated to again appear sideways.

Although portable information handling systems typically sense orientation, desktop information handling systems generally have little need to do so. Typically, desktop information handling systems rest in a fixed position and interact with peripherals also having a fixed position. At initial configuration, a camera and display typically default to a landscape orientation and allows an end user selection of a portrait orientation through a user interface. Often, a peripheral camera couples to a peripheral display so that rotation of the display from the landscape to the portrait orientation will also rotate the camera to capture visual images in the portrait orientation. This is not necessarily the case, however, since peripheral cameras can rest on stands or couple to other fixed objects and can do so in either the landscape or portrait orientation. Thus, an end user may have to separately configure the camera and display to view images captured by the camera in an upright orientation.

SUMMARY OF THE INVENTION

Therefore, a need has arisen for a system and method which automatically corrects presentation of visual image orientation at an information handling system display.

In accordance with the present invention, a system and method are provided which substantially reduce the disadvantages and problems associated with previous methods and systems for adjusting the orientation of visual images captured by a camera for presentation at a display. Detected faces in a visual image are analyzed to determine an upright orientation and the face upright orientation is applied to adjust the camera visual image to an upright orientation aligned with the face upright orientation.

More specifically, an information handling system interfaces with a peripheral camera to accept visual images captured by the camera. The visual images are analyzed to detect a face and, once a face is detected, an upright orientation of the face is determined, such as with T zone, Y zone and/or V zone analysis. The face orientation is applied to adjust the visual image orientation to align with the face orientation, such as by commanding a landscape or portrait orientation that most closely aligns with the face orientation. In one example embodiment, the visual image orientation analysis is performed at an image sensor processor (ISP) in the camera so that the visual image is communicated from the camera with an upright orientation. Alternatively, the visual image orientation analysis may be performed at an information handling system interfaced with the camera, which commands the upright orientation to the camera.

The present invention provides a number of important technical advantages. One example of an important technical advantage is that a peripheral camera that lacks orientation sensors determines an upright orientation of visual images captured by the camera to adjust the visual images for communication in an upright orientation. The face upright orientation analysis is rapid and accurate so that the vertical orientation analysis consumes minimal resources and has minimal impact on camera performance. In one embodiment, an information handling system executes an application that automatically sets the camera vertical orientation so that cameras without local logic to perform orientation adjustments may have visual images adjusted remotely in an automated manner.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system peripheral camera analyzes captured visual images to detect a face and aligns the camera visual image with an upright orientation of the face. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
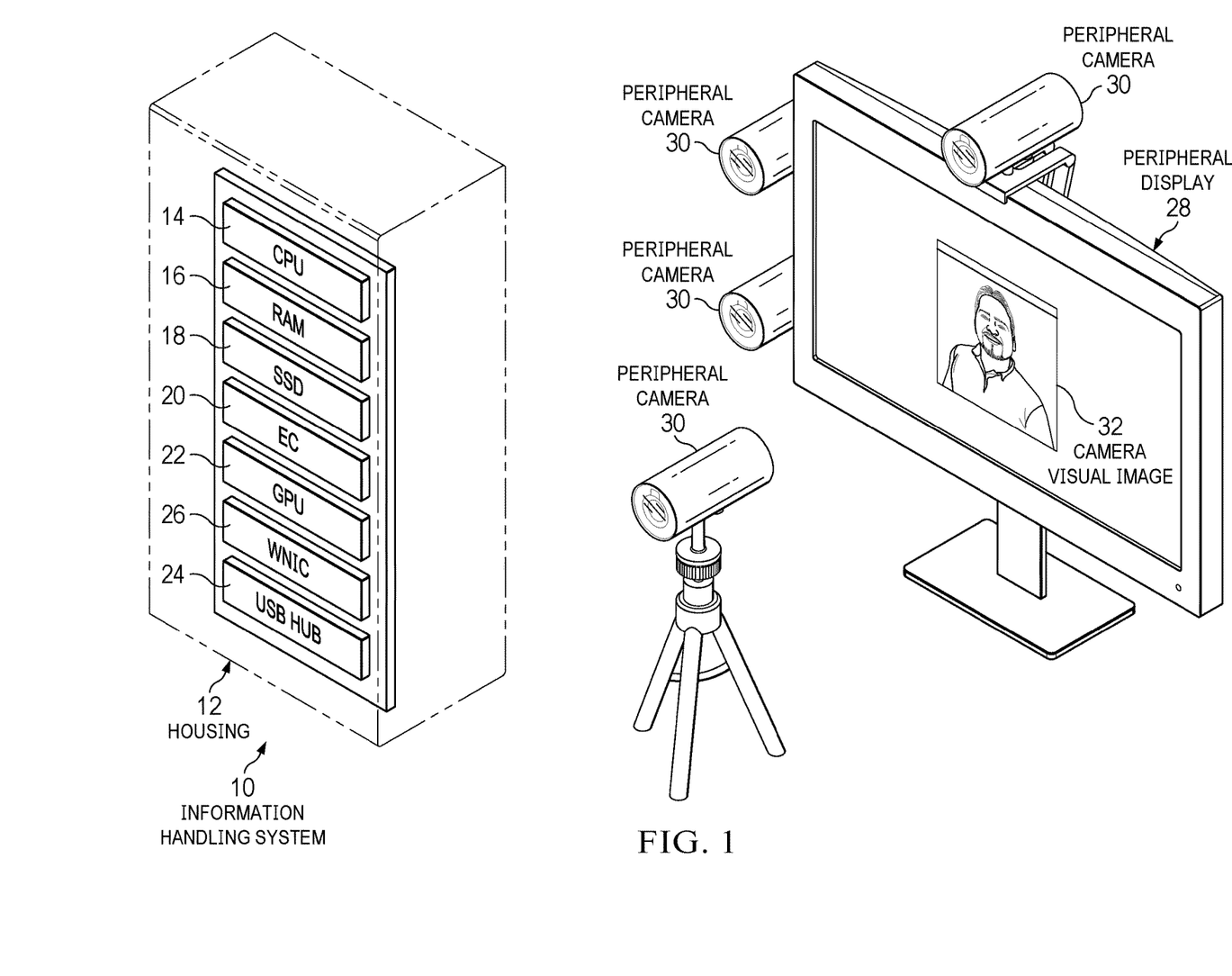
FIG. 1 depicts an information handling system interfaced with plural peripheral cameras that each capture visual images at a vertical orientation.

Referring now to FIG. 1, an information handling system 10 interfaces with plural peripheral cameras 30 that each capture visual images at a vertical orientation. In the example embodiment, information handling system 10 has a desktop configuration with processing components built in a stationary housing 12. A central processing unit (CPU) 14 executes instructions that process information in cooperation with a random access memory (RAM) 16 that stores the information and instructions. For example, a solid state drive (SSD) 18 provides persistent non-transitory memory stores in an operating system and applications during system power down that are retrieved at system power for execution by CPU 14. An embedded controller (EC) 20 supports physical interactions of components at information handling system 10, such as application of power and maintaining thermal constraints. In addition, embedded controller 20 supports interaction with external devices, such as peripheral devices like a keyboard and mouse. A graphics processing unit (GPU) 22 further processes information to define visual images for presentation at a peripheral display 28, such as by generating pixel values that define the color of pixels presented at the display. A USB hub 24 supports cable communications with peripheral display 28 and other peripherals, such as with Type C USB cables. A wireless network interface controller (WNIC) 26 supports wireless communication through a radio, such as with WIFI or Bluetooth.

In one example embodiment, peripheral display 28 presents a videoconference based upon execution of a videoconference application by CPU 14. The videoconference includes a camera visual image 32 captured by a peripheral camera 30. Peripheral camera 30 may be arranged in a variety of positions relative to peripheral display 28 to capture visual images of the end user from a desired perspective. For instance, peripheral camera 30 may mount at the top side of peripheral display, at a corner of peripheral display 28, on a side surface, at a bottom side and/or on a stand. In each position, peripheral camera 30 may have a different vertical alignment so that visual images captured by the peripheral camera will appear sideways or upside down. Further, the camera has a cylinder housing so that a free-resting camera may rotate on the housing to have a variety of orientations. To adjust the visual image orientation provided from the camera, logic executing on the camera analysis captured visual images to detect a face. When a face is detected, the logic analyzes the face to determine an upright orientation of the face and applies the upright orientation of the face to align the captured visual image with the upright orientation of the face. For instance, a top side camera couples with an upright orientation so that no change is made to the visual image. A side camera couples with a portrait orientation of the visual image so that the captured visual image will have the face upright orientation to the side. To correct this orientation, the camera is commanded to send the visual image with a portrait orientation that aligns with the face upright orientation. A bottom mount camera couples with an inverted orientation so that captured visual image is inverted to align with the face upright orientation. In one example embodiment, visual image orientation may adjust in specific angular increments, such as 45 degrees.

Figure 2:
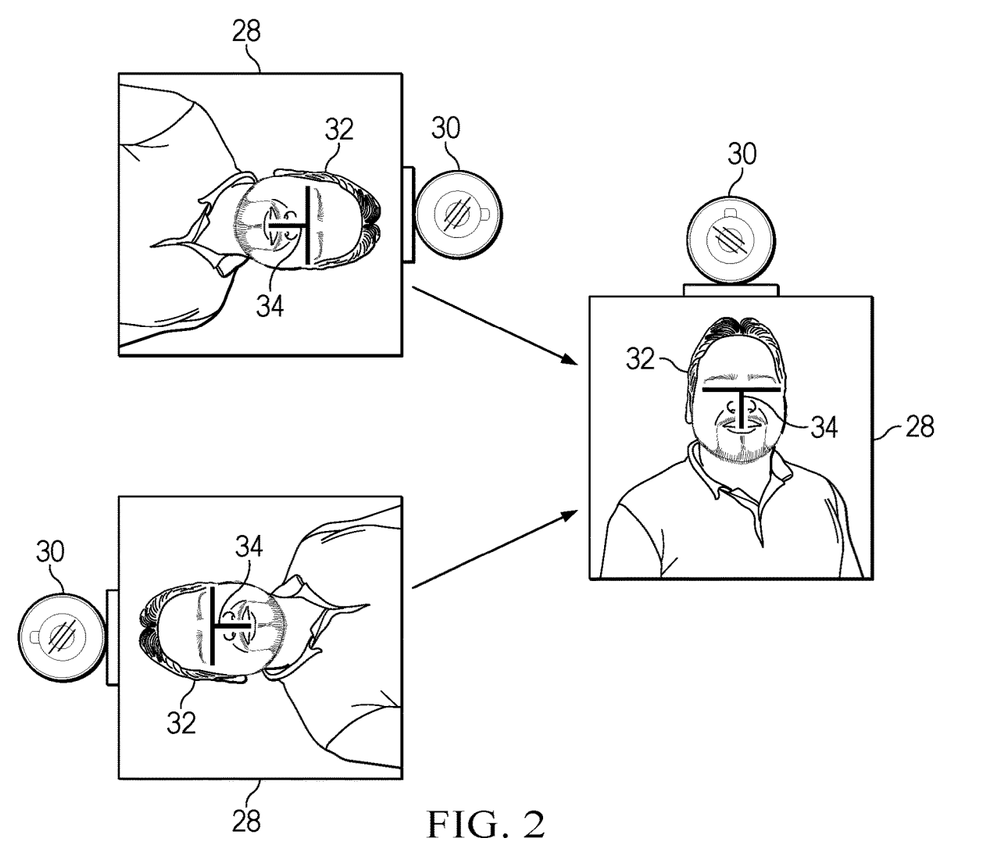
FIG. 2 depicts examples of visual image presentation for visual images captured by cameras at different vertical orientations.

Referring now to FIG. 2, examples of visual image presentation are depicted for visual images captured by cameras at different vertical orientations. In one instance, peripheral camera 30 mounts to the upper surface of display 28 so that the camera visual image 32 of the end user is vertically aligned when presented at display 28. In another instance, peripheral camera 30 mounts on a right side of display 28 so that the visual image 32 is captured in a sideways orientation 90 degrees off of vertical alignment. In yet another instance, peripheral camera 30 mounts of a left side of display 28 so that the visual image 32 is captured in a sideways orientation 270 degrees off of vertical alignment. The peripheral camera has a manual user interface that an end user can select to change the orientation of the captured visual image so that a vertical orientation is presented. As is described below in greater detail, logic executing on the camera processing resource automates the orientation selection of the visual image by detecting a face with a T zone 34 analysis or similar analysis that rapidly and accurately references eye, nose and mouth positions to determine a vertical orientation.

Figure 3:
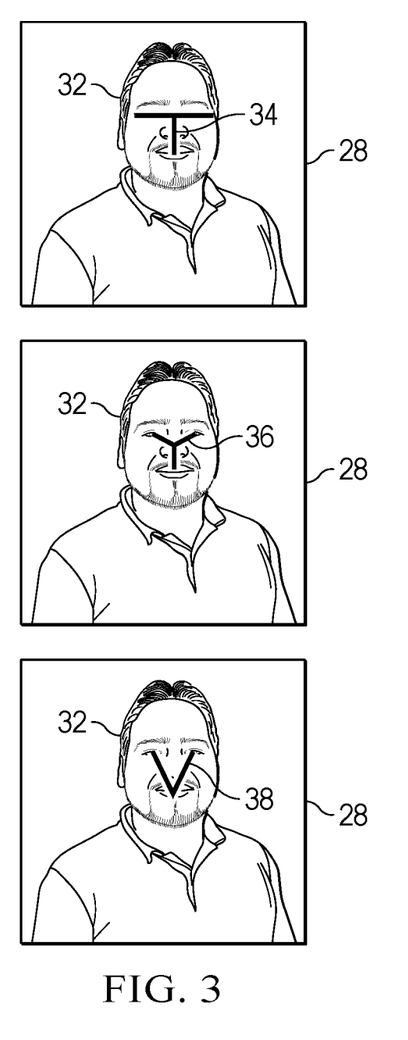
FIG. 3 depicts T-zone, Y-zone and V-zone analysis examples that are depicted that aid in determination of a face orientation.

Referring now to FIG. 3, T-zone 34, Y-zone 36 and V-zone 38 analysis examples are depicted that aid in determination of a face orientation. Each of T-Zone 34, Y-zone 36 and V-zone 38 focus on detecting both the user's eyes and one or both of the nose and/or mouth to quickly determine face orientation. This type of relatively simple 3-point detection provides a rapid detection speed with minimal processing that can be managed at an image sensor processor (ISP) with video stream rates of 30 frames per second. A You Only Look Once (YOLO) based algorithm is a powerful tool since the eyes, nose and mouth features tend to have a high contrast ratio in relation to a user's face. A YOLO type algorithm is generally capable of detecting these features at 45 frames per second, which will support a video use case.

Figure 4:
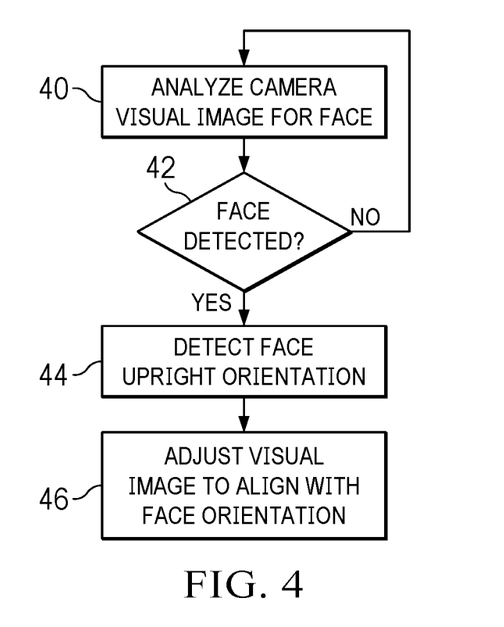
FIG. 4 depicts a flow diagram of a process for correcting a camera visual image upright orientation to align with a face vertical orientation.

Referring now to FIG. 4, a flow diagram depicts a process for correcting a camera visual image upright orientation to align with a face vertical orientation. The process starts at step 40 with analyzing the camera visual image to detect a face. If at step 42 no face is detected, the process returns to step 40 to wait for detection of a face. If at step 42 a face is detected, the process continues to step 44 to detect the upright orientation of the face by reference to facial features, such as with T zone, Y zone or V zone analysis. Once the face upright orientation is detected, the process continues to step 46 where the visual image generated by the camera is adjusted to align the upright orientation of the visual image with the upright orientation of the face. Once an upright orientation is assigned to the camera visual image, the camera orientation is typically stationary so that periodic checks rather than constant monitoring is used to ensure the visual image orientation remains correct over time. In one alternative embodiment, in addition to checking orientation at an event like a camera movement, camera orientation is checked and verified on a periodic basis, such as every quarter second, half second, and/or every second. When periodic orientation verification is done, hysteresis logic may be applied to avoid changes in camera orientation commanded too frequently or for slightly off-axis changes to detected facial orientations. For instance, facial orientation may be measured in absolute terms at each check or as a comparison with a most recent detected orientation. As another example, when a camera orientation is set, multiple readings with a changed orientation may be required before a change in camera orientation is commanded. In one embodiment having selection between landscape and portrait orientations, the angle of facial orientation needed for a change may exceed 45 degrees, such as by requiring 55 or 60 degrees of off axis orientation before commanding a change in camera orientation. As is described below, this off axis angle may also vary based upon context of other items detected in the camera field of view, like tables or chairs that typically have defined orientation relative to vertical. Further, hysteresis logic may vary based upon whether camera motion is detected so that more rapid orientation checks are performed when camera movement is detected.

Figure 5:
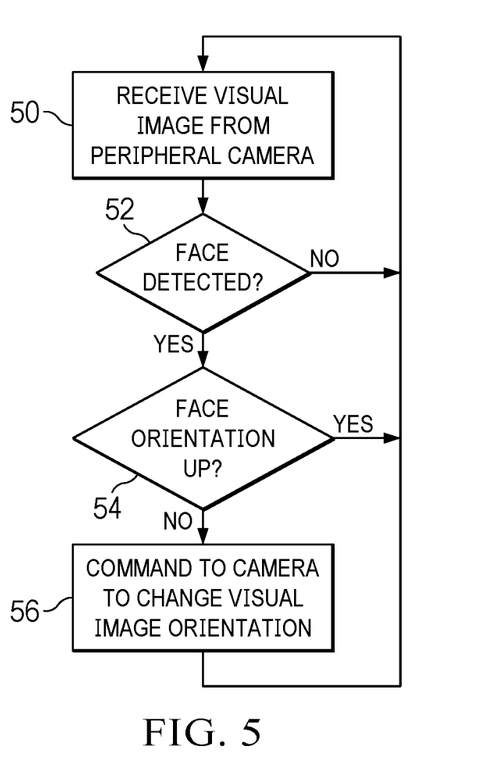
FIG. 5 depicts a flow diagram of a process for commanding an adjustment to a camera visual image based upon an information handling system analysis of a face upright orientation in the camera visual image.

Referring now to FIG. 5, a flow diagram depicts a process for commanding an adjustment to a camera visual image based upon an information handling system analysis of a face upright orientation in the camera visual image. The process starts at step 50 by receiving the visual image from the peripheral camera. At step 52 a determination is made of whether a face is detected in the visual image. If not, the process returns to step 50. If a face is detected, the process continues to step 54 to determine if the face orientation is vertically upward and correct as received from the camera. If the face is correctly vertically aligned in the visual image, the process returns to step 50. If at step 54 the face is not vertically aligned, the process continues to step 56 to command the camera to change the visual image orientation that is communicated to the information handling system. For instance, the operating system camera driver sends a command to the camera to change between landscape or portrait orientation so that the face has a vertical alignment as sent from the camera to the information handling system. As an alternative, the information handling system may change the visual image orientation as the visual image is received at the information handling system so that the camera image is correctly oriented relative to the face orientation. In some embodiments, the information handling system can then communicate the visual image with the correct orientation to a videoconference. In other situations, the peripheral camera may communicate visual images directly through the network to the videoconference so that processing to a correct orientation at the camera provides a better user experience.

Figure 6:
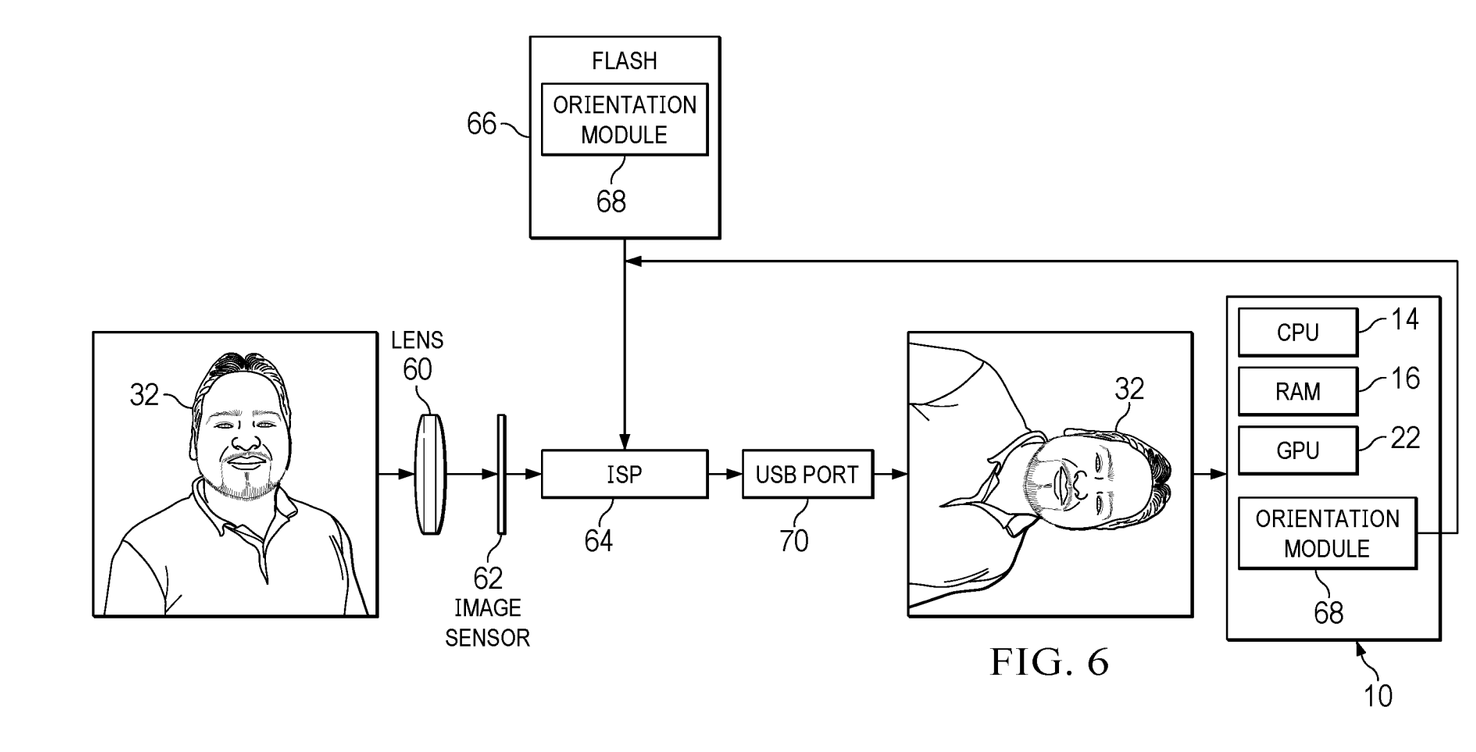
FIG. 6 depicts a block diagram of a camera processing resource configured to adjust visual image vertical orientation based upon the vertical orientation of a face in the visual image.

Referring now to FIG. 6, a block diagram depicts a camera processing resource configured to adjust visual image vertical orientation based upon the vertical orientation of a face in the visual image. In the example embodiment, an end user 32 is captured by an image sensor 62 through a lens 60, such as a set of pixel values detected from light directed towards image sensor 62. An image sensor processor (ISP) 64 manages the visual image by adjusting the captured visual image with a variety of enhancement algorithms, such as to optimize light and color. A flash non-transitory memory 66 stores an orientation module 68 that executes on ISP 64 to detect faces in the visual image and analyze the faces to determine a vertical orientation of the faces. Once a face vertical orientation is known, the camera orientation is assumed to align with the face orientation so that orientation module 68 selects landscape or portrait orientation for communication of the visual images that most closely aligns with face vertical orientation. The visual image 32 is rotated to the selected vertical orientation and communicated through a USB port 70 or other medium to information handling system 10. In the example embodiment, information handling system 10 also includes an orientation module 68, such as within an operating system driver of the camera. As visual image 32 is streamed to information handling system 10 and presented at a display by GPU 22, orientation module 68 monitors the visual image for faces and checks to see if the faces are presented at the display with an upright orientation. If not, the orientation module communicates the correct orientation as a command to ISP 64 to select the correct visual image orientation, such as a landscape or portrait orientation.

The example embodiment described above uses T, Y and V zone analysis to obtain a rapid and accurate facial orientation so that minimal camera processing resources are consumed detecting a face and determining an upright facial orientation. In alternative embodiments, other and additional techniques may be used to efficiently apply camera processing resources for detecting and tracking a vertical facial orientation and the associated camera orientation setting to keep visual images vertically aligned in a correct manner. As an example, a user presence detection, such as an infrared time of flight (IRTOF) sensor may be used to detect a user presence and trigger analysis to detect a face. When a body is detected, the body shape, such as the head versus shoulder location, may be used to determine a vertically aligned orientation where the head position above the shoulders indicates up. Body detection and a head and shoulder analysis offer an alternative where a person in a visual image has her back turned to the camera. Further, the eyes, nose, mouth and the head and should analysis may complement each other to confirm an orientation analysis. Once an upright orientation is determined, landmarks in the visual image may be identified and compared in location over time. In one embodiment, at initial setup of a camera a visual image is captured and sent by network communication to a network location where a deep analysis is performed to identify vertical references for use by the camera in the captured field of view. For example, a permanent fixture like a door or window frame provides a more reliable reference than fixtures that can move so that the camera more accurately detects movement that might require an update to the orientation setting.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions that process information;
   a memory disposed in the housing and interfaced with the processor, the memory operable to store the instructions and information;
   a storage device interfaced with the processor and having non-transitory memory;
   a display interfaced with the processor and operable to present the information as visual images; and
   a peripheral camera external the housing and interfaced with the processor, the peripheral camera having a lens, an image sensor, a processing resource and a non-transitory memory storing instructions that when executed on the processing resource cause:
   capture of visual images with a first orientation;
   communication of the visual images to the processor;
   receipt of an orientation adjustment from the processor;
   adjustment of the visual images to a second orientation by application of the orientation adjustment; and
   communication of the visual images to the processor with the second orientation;
   wherein the storage device stores instructions that when executed on the processor cause:
   analysis of the visual images captured by the peripheral camera to detect a face and determine an upright orientation of the face;
   determination of the orientation adjustment to align an upright orientation of the visual image as communicated from the peripheral camera with the upright orientation of the face; and
   communication of the orientation adjustment to the peripheral camera for application by the peripheral camera to adjust the visual images to the second orientation for communication to the processor and for presentation at the display with the upright orientation in a videoconferencing application.

2. The information handling system of claim 1 wherein the instructions stored in the peripheral camera non-transitory memory when executed on the processing resource cause: communicate the visual image to the processor in one of a landscape or portrait orientation selected as the closest to the orientation of the face.

3. The information handling system of claim 1 wherein the instructions stored in the peripheral camera non-transitory memory when executed on the processing resource cause: communicate the visual image to the processor in 45 degree increments of the upright orientation.

4. The information handling system of claim 1 further comprising instructions stored in the storage device non-transitory memory that when executed on the processor cause: analysis of the visual image communicated from the peripheral camera to detect the face and determine the upright orientation of the face; and adjustment of the visual image orientation when the orientation of the face does not align with an upright orientation of the display.

5. The information handling system of claim 4 wherein the storage device non-transitory memory instructions adjust the visual image by commanding a change in the orientation of the visual image at the peripheral camera.

6. The information handling system of claim 1 wherein the peripheral camera processing resource detects the upright orientation of the face with a T-zone analysis of the face.

7. The information handling system of claim 1 wherein the peripheral camera processing resource detects the upright orientation of the face with a Y-zone analysis of the face.

8. The information handling system of claim 1 wherein the peripheral camera processing resource detects the upright orientation of the face with a V-zone analysis of the face.

9. A method for communicating visual images from a camera to an information handling system, the method comprising:
   capturing visual images with the camera at a first orientation;
   communicating the visual images to an information handling system;
   detecting a face in the visual images with the information handling system;
   analyzing the face with the information handling system to determine an upright orientation of the face;
   communicating an orientation adjustment from the information handling system to the camera;
   adjusting the visual image at the camera by applying the orientation adjustment to align with the upright orientation of the face at the camera as determined by the information handling system;
   communicating the visual image from the camera with the upright orientation of the face to the information handling system, the camera and the information handling system having separate housings; and
   presenting the visual image at a display with the upright orientation in a videoconferencing application.

10. The method of claim 9 further comprising:
    adjusting the visual image to a landscape orientation when the orientation of the face aligns more closely with the landscape orientation than a portrait orientation; and
    adjusting the visual image to the portrait orientation when the orientation of the face aligns more closely with the portrait orientation than the landscape orientation.

11. The method of claim 9 further comprising adjusting the visual image in 45 degree increments.

12. The method of claim 9 further comprising:
analyzing the visual image communicated from the camera to detect the face and determine the upright orientation of the face; and
adjusting the visual image orientation when the orientation of the face does not align with an upright orientation of the display.

13. The method of claim 12 further comprising detecting the face upright orientation with a T-zone analysis of the visual image.

14. The method of claim 12 further comprising detecting the face upright orientation with a Y-zone analysis of the visual image.

15. The method of claim 12 further comprising detecting the face upright orientation with a V-zone analysis of the visual image.

16. A camera comprising:
a housing;
a lens disposed in the housing;
an image sensor aligned with the lens to capture a visual image from light directed through the lens;
a processing resource interfaced with the image sensor; and
a non-transitory memory interfaced with the processing resource, the non-transitory memory storing instructions that when executed on the processing resource cause:
communicate the visual image to an information handling system in a first orientation, the visual image including a human face, the information handling system in a separate housing from the camera;
receive from the information handling an orientation adjustment based upon an orientation of the human face detected by the information handling system;
adjustment of the visual image at the camera by applying the orientation adjustment to align the visual image to a second orientation as communicated from the information handling system with the upright orientation of the face; and
communication of the visual image from the camera to the information handling system for presentation of the visual image at a display of the information handling system in a videoconference at the second orientation.

17. The camera of claim 16 wherein the information handling system detects the upright orientation of the face with a T-zone analysis.

* * * * *